Oct. 21, 1952　　　　　A. G. PERKINS　　　　　2,614,530
CONTROL UNIT FOR MILKING MACHINES

Filed Dec. 9, 1949　　　　　　　　　　2 SHEETS—SHEET 1

INVENTOR
Albert G. Perkins
By Walter P. [Snyder]
ATTORNEY

Oct. 21, 1952 — A. G. PERKINS — 2,614,530
CONTROL UNIT FOR MILKING MACHINES
Filed Dec. 9, 1949 — 2 SHEETS—SHEET 2
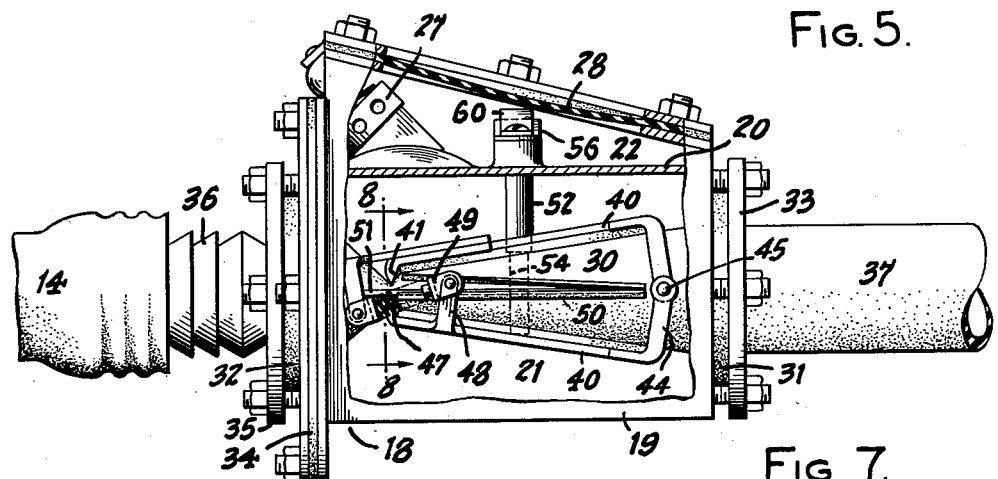
FIG. 5.
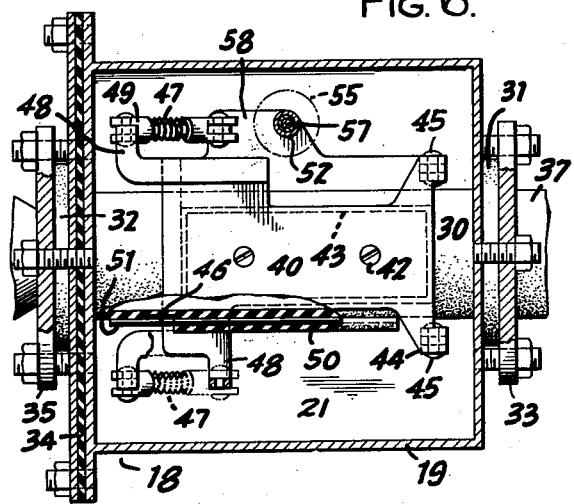
FIG. 6.
FIG. 7.
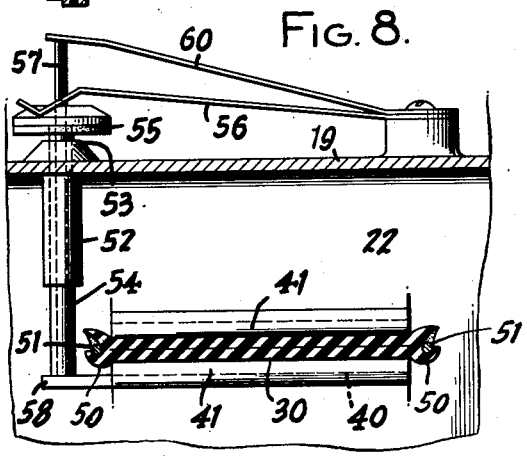
FIG. 8.
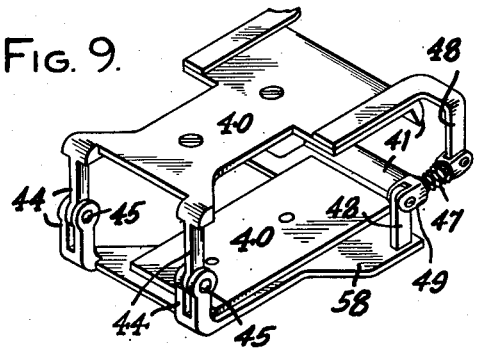
FIG. 9.
INVENTOR
Albert G. Perkins,
BY Walter P. Fryer
ATTORNEY Patented Oct. 21, 1952

2,614,530

UNITED STATES PATENT OFFICE 2,614,530

CONTROL UNIT FOR MILKING MACHINES

Albert G. Perkins, Grand Island, N. Y.

Application December 9, 1949, Serial No. 132,007

11 Claims. (Cl. 119—14.08)

This invention relates generally to an automatic control for milking machines but more particularly to a control unit for causing the automatic dropping of the teat cups from the cow as the respective quarters of the cow's bag are milked out and thereby prevent injury to the cow when the machine is left on too long.

It has for its primary object to provide a self-contained device or appliance of this character which is adapted to be interposed in each of the milk flow connections of a milking machine, which is so designed as to automatically respond and cut off the vacuum in the milk flow connection to the teat cup when the surge of milk from the companion quarter of the cow's bag substantially ceases to thereupon cause that cup to be released and drop by gravity from the cow, and which is further so designed as to be inoperative to become released from the cow's teat when the cow temporarily lets down on her milking.

Another object of the invention is to provide an individual teat cup releasing device for milking machines having a novel arrangement of releasably-contractible jaw and valve means for effectually governing the contraction of the interposed milk flow tube and for assuring the sealing of the vacuum to the teat cup at such time as the flow of milk from such companion cup substantially ceases, as well as positive means for subsequently venting the tube to restore the jaw and valve means to their initial positions.

A further object is to provide the interposed contractible milk tube with means for assuring its positive collapse to a vacuum sealing position with a minimum of resistance.

Other features of the invention reside in the construction and arrangement of parts hereinafter described and particularly pointed out in the appended claims.

In the accompanying drawings—

Figure 1:
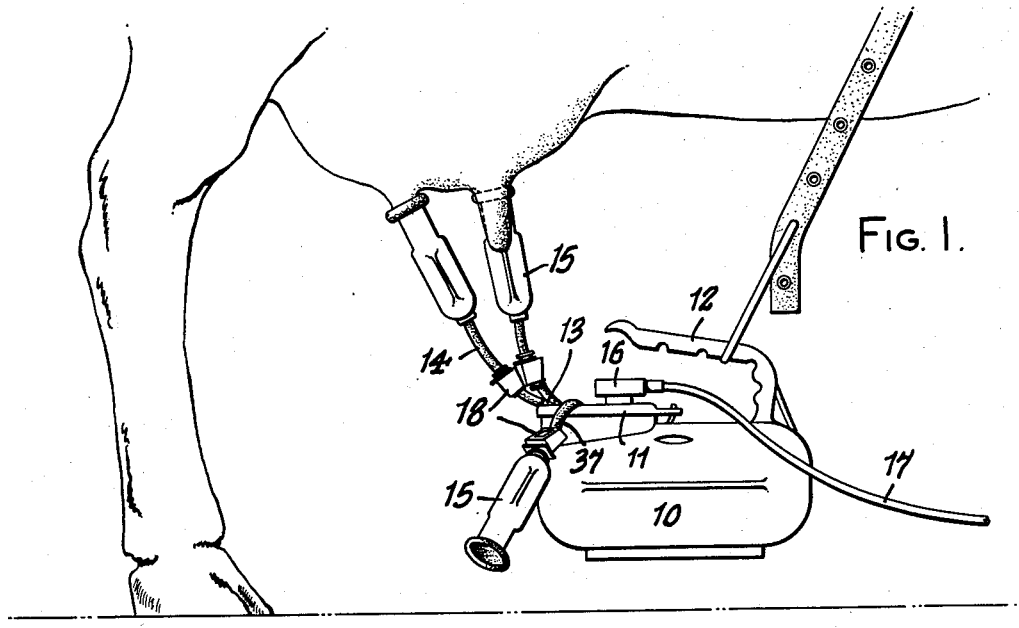
Figure 2:
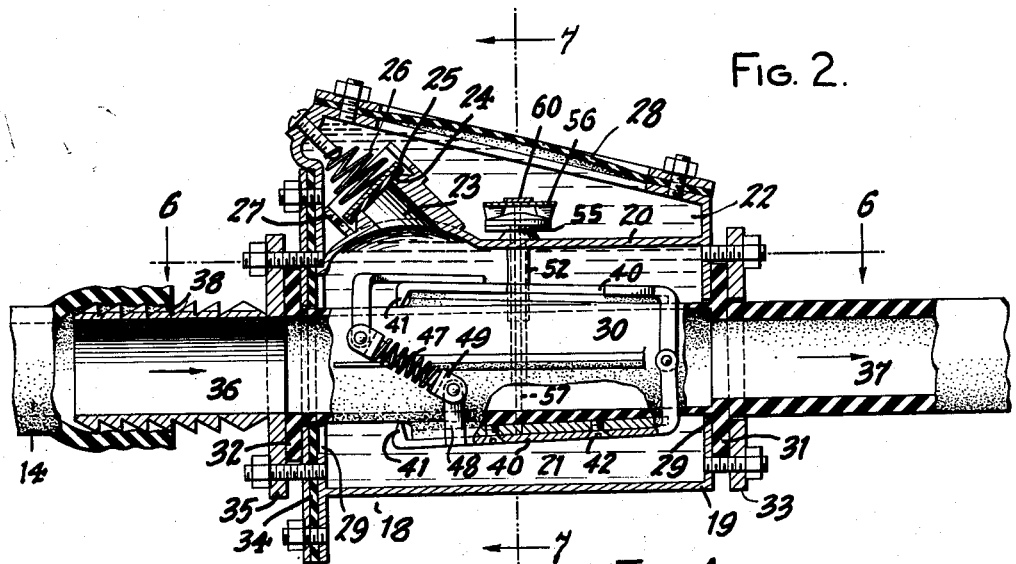
Figures 3, 4:
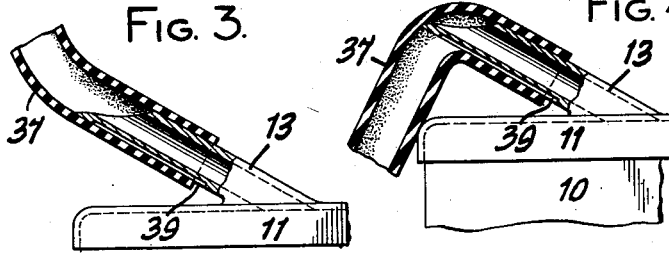

Figure 1 is a side view of a milking machine suspended in operative relation to the cow and showing my control devices in the teat cup connections thereof, one of the cups being shown as having been automatically dropped from the cow after the corresponding quarter had been milked out. Figure 2 is an enlarged vertical medial longitudinal section of one of the devices in a milking position. Figures 3 and 4 are enlarged fragmentary sectional views showing the sealed and vented positions, respectively, of a teat cup connection to the cover-intake spouts of the milking machine before and after its teat cup drops from the cow. Figure 5 is a section, similar to Figure 2, but partly in elevation, showing the parts of the device in its shut-off position. Figure 6 is a horizontal section taken on line 6—6, Figure 2. Figure 7 is a cross section taken on line 7—7, Figure 2. Figure 8 is an enlarged fragmentary cross section taken on line 8—8, Figure 5. Figure 9 is an enlarged detached perspective view of the tube-engaging units of the device.

Similar characters of reference indicate corresponding parts throughout the several views.

By way of example, I have shown my teat cup dropping control device or controlled quarter milker applied to a well known type of pulsating milking machine wherein 10 indicates the milk-receiving can having a cover 11 and bail 12, the cover having intake spouts 13 radiating therefrom and each connected by a flexible conduit or hose connection 14 having a teat cup 15 at its free end for detachable connection to one of the cow's teats. Also applied to the cover is the customary pulsator 16 which is connected by a hose 17 to the suction source. Interposed substantially axially in each hose connection 14 is one of my control units, indicated generally by the numeral 18, through which the milk flows from the cow to the can, and which performs as a valve, as each quarter of the cow's bag is milked out, to automatically shut off the vacuum thereto and cause the companion teat cup to drop from the cow, as depicted in Figure 1, to effectually prevent injury to the cow from overmilking, and subsequently cause the automatic restoration of the unit to its initial position.

In the preferred embodiment of my invention shown in the drawings, each control unit consists of a hollow body or casing 19 having a partition 20 therein dividing it into a lower chamber 21 and an upper chamber 22, each adapted to be filled with a constant viscosity fluid and with the partition provided with an obliquely-disposed port 23 including a valve seat 24 controlled by a check valve 25 backed by a light conical spring 26, whereby communication between these chambers is established and automatically controlled in accordance with a change in vacuum. In its pendant position between the cow and the can, this control unit assumes a more or less inclined position, as shown in Figure 1, and the oblique port 23 assumes a substantially vertical position with the valve 24 guided for displacement in a tubular extension 27 rising from the partition 19. This valve is normally closed but is free to open in response to a pressure flow of the fluid from the lower chamber to the upper chamber. The top wall of the chamber 22 is provided with a displaceable diaphragm 29 secured at its marginal edges to the flanged top of the casing 19.

At its opposite ends and substantially centrally of its lower chamber 21, the casing has openings 29 through which extend the intake and discharge ends of a flexible, contractible tube-like conduit section or valve member 30, of rubber or like material in fluid-sealed relation to such chamber and in interposed milk flow communication with the companion teat cup hose or connection 14. In cross section this tube section is substantially oval-like in shape with flat top and bottom faces to collapse into the position shown in Figure 8 when the companion quarter of the cow's bag has been milked out, and at its ends is provided with annular attaching flanges 31, 32 which bear externally against the end walls of the casing 19. The flange 31 is secured to its companion end wall by a clamping washer 33, while the companion tube section flange 32 bears at its inner face against a gasket 34 disposed about the larger opening 29 in the companion casing-wall and is secured to such wall by the attaching flange 35 of a nipple 36 to which the intake or teat cup end of the hose connection 14 is detachably connected. That end of the tube section 30 bearing the flange 31 has an extension 37 which in operation constitutes the discharge end of the hose connection for coupling it to one of the intake spouts 13 of the milk-receiving can. It will be noted in Figure 2 that the internal diameters of the hose connection 14 and tube section 30 are substantially uniform while the diameter of the extension 37 is somewhat less to provide for an even and relatively high velocity of surge or flow of the milk from the cow to the tube section, from which point the flow is retarded somewhat on reaching the extension to prevent the closing of the tube section and the shutting off of the vacuum to the teat cup during normal milking operations or during such times as the cow may temporarily let up on her milking.

A capillary-like vent passage 38 is provided between the hose section 14 and the nipple 36 to properly vent the connection and its teat cup to the atmosphere after the companion quarter of the cow's bag has been milked out and the tube section 30 contracted to its closed or sealed position as hereinafter described, to permit the teat cup to drop from the cow. A similar vent passage, in the form of a longitudinal groove 39, is provided in the underside of each of the intake spouts 13 with the companion tube section extension 37 encircling the same for the purpose of properly venting the control unit to restore its collapsed parts to their initial position after a teat cup drops from the cow. At its front end this vent groove terminates short of the end of the spout while its rear end is exposed beyond the encircling portion of the extension, whereby the vent is closed to the atmosphere by the extension in the operative milking position of the teat cup unit on the cow, as seen in Figure 3, and the vent opened to the atmosphere when the teat cup is dropped from the cow and the tube section extension bent over its spout, as seen in Figures 1 and 4, which causes, firstly, the underside of the spout-engaging portion of the extension 37 to drop away from vent-sealing relation with the closed front end of such groove to vent the control unit to the atmosphere, and secondly, the top side of such extension to close over and seal the intake end of the spout to close off the vacuum to the control unit.

Applied to diametrically opposite faces of the contractible tube section 30 and between the flanges 31, 32 thereof are means for causing its uniform contraction along a transverse plane or line to a closed position when the surge of milk from the cow substantially ceases, such tube section and associated means functioning as a valve to shut off the vacuum to the teat cup. This means preferably consists of flat plates 40, 40 applied to the flat top and bottom faces of the tube section to move therewith toward and from each other in accordance with the contraction or expansion of the tube-section and having oppositely-facing tube-engaging elements or jaws 41 at one end for biting into and sealing such tube-section in its contracted position shown in Figures 5 and 8. These jaw plates may be secured in place by screws 42 applied to attaching plates 43 embedded in the opposite sides of the tube section, as shown in Figure 2, and to properly and uniformly guide the jaws 41 toward and from a shut-off position along a transverse line, I provide the opposite ends of the plates 40 with opposing hinge ears 44 joined by companion transverse hinge pivots 45 at the opposite sides of the tube and in the axial plane thereof. Those sides of the tube section which are crimped or folded upon its contraction are recessed, as indicated at 46, in the intersecting plane of the plate-jaws to reduce the thickness of the tube section at those points.

For the purpose of normally urging the hinged plates 40 with the tube-section 30 to their expanded position as well as to function in assisting the contraction of the tube-section to its sealed position at a predetermined time during the operation of contraction due to the cow being milked out, I preferably employ coil springs 47 at opposite sides thereof. Each spring is interposed between opposing lugs or posts 48 applied to the plates and having transversely-pivoted, spring-abutting seats 49 thereon upon which the ends of the springs are supported and upon which they are free to pivot in response to the movements of the jaw-plates. In its normal position, each spring assumes the disposition shown in Figure 2, with the ends of the posts disposed one below the other in offset relation and with the spring urging the plates to their expanded position. As the tube-section and plates gradually contract in response to a companion quarter of the cow's bag being milked out, the springs are displaced beyond a dead center line position as the ends of the posts 48 assume a relatively reversed position, whereupon such springs then aid in the quick collapse of the tube-section to its closed or sealed position shown in Figure 3.

Along its opposite sides for a portion of its length and in the plane of its folds when contracted to a vacuum sealing position, the tube-section 30 has longitudinally-slit beads 50 forming grooves in which relative fine wires 51 are disposed for resisting any tendency of the tube-section to collapse or fold inwardly and insure its distention outwardly to the sealed position shown in Figure 8. By preference, these wires are anchored or secured along their lower sides or halves to the companion lower sections of the slit beads while their upper sides or halves are unsecured so that during the collapse of the tube-section the upper sections of the beads are free to spread and separate from the wires in the manner depicted in Figures 5 and 8.

In addition to the valved port 23 which is forced open during the tube-expanding action after collapse to a vacuum sealing position to permit a compensating volume of fluid to be quickly displaced from the lower chamber 21 into the upper chamber 22, I provide a capillary vent or by-pass which constantly establishes communication between these chambers and permits a compensating volume of fluid to flow slowly between them during the tube-contracting and expanding actions which take place during the milking operation and afford a time control in regulating the collapse of the tube-section. To this end the partition 20 has a tubular member or sleeve 52 depending part way into the lower chamber 21 at one side of the tube-section 30 which opens at it ends into the upper and lower chambers and with its open upper end terminating in a valve seat 53 rising above the top side of the partition. Guided loosely in this sleeve for vertical displacement is the hollow stem 54 of a valve 55 which functions as a fluid release valve and normally is urged downwardly against the valve seat 53 by a flat spring 56 to close the resulting fluid passage formed between the sleeve and the valve stem. Extending freely and in loose-fit fashion through the hollow valve stem to provide a constant capillary passage or vent between the chambers 21, 22 is a pin 57 which bears at its lower end against the top side of a lateral face or extension 58 formed on the lower jaw-plate 40, while its upper end extends above the valve 55 and through a notch 59 in the free end of the spring 54 and abuts against the lower face of a flat spring 60, disposed in overlying fashion to such companion flat spring 56, for urging such pin downwardly in contact with the registering lateral face 58 of such jaw plate. It will be noted that in the expanded position of the tube-section 30 the pin 57 telescopes below the valve stem 54 and the latter telescopes below the lower end of the sleeve 52 so that during partial deflations and expansions of the tube-section, as occurs during the milking operation, the pin is displaced or reciprocated vertically and in so doing serves to maintain the capillary vent passage clean and prevent its clogging. As the tube-section approaches its fully collapsed position, the lower end of the valve stem is encountered by the lateral extension 58 of the lower jaw plate and it is displaced upwardly to open the valve 55, as shown in Figure 8, and thereby permit a quicker displacement of the fluid from the upper fluid chamber into the lower chamber to effect a prompt collapse of the tube section to its vacuum sealing position.

In operation, each control unit operates independently to shut off the vacuum to its teat cup when the companion quarter of the cow's bag is milked out, and at that time the constant vacuum in the system causes the tube-section 30 and its hinged plates 40 to contract gradually, first against the tension of the springs 47 and, subsequently to such springs fulcruming around from the position shown in Figure 2 to that shown in Figure 5, with the aid of the springs to finally collapse smartly to the tube-sealed position shown in Figures 5 and 8. During the initial stages of the tube-contracting action, a compensating volume of fluid is by-passed in capillary fashion through the passage formed by the pin 57 and hollow valve stem 54 from the upper chamber or reservoir 22 into the lower chamber 21, and during this time the diaphragm 28 is correspondingly displaced inwardly. When the jaws reach a position immediately beyond the dead center line of their springs 47, the valve 55 is caused to open and the final stage of the contraction of the tube-section is quickly effected to seal the same to its vacuum sealing position shown in Figures 5 and 8. Thereupon, the vacuum is cut off to the teat cup, atmosphere is admitted to the teat cup hose connection 14 through the capillary vent 38 which results in the companion teat cup 15 dropping from the cow to the inverted hanging position at one side of the milk-receiving can 10, as shown in Figure 1. In this position of the teat cup connection, the tube-section extension 37 folds itself over the companion cover spout 13 to seal off the vacuum to the opposing end of the control unit and at the same time vent the same to the atmosphere through the passage 39, which results in the inflation or expansion of the tube-section 30 and its embraced parts to their initial or normal positions, the springs 47 aiding in the final restoration of the parts to such positions. During this tube-expanding action, a compensating volume of fluid is forced comparatively quickly from the lower chamber 21 into the upper chamber 22 through the port 23 and its then opened check valve 25. With the milking machine in operation and the milk surging through the control unit from the cow to the can, the tube-section and associated jaw elements will contract and expand or fluctuate more or less with the pulsations in the system or tend to collapse should the cow temporarily let down on her milking, but the capillary flow control of the fluid between the chambers, the retarding of the flow of milk through the control unit by the reduced diameter of its discharge extension 37 and the resisting action of the springs 47 operate as a time element to arrest the performance of a complete collapsing cycle and prevent the collapse of the tube-section to an area to interfere with the normal milking operation. However, when a given quarter is milked out, then the collapsing cycle is allowed to be completed to seal the tube-section and permit the companion teat cup to automatically drop from the cow.

I claim as my invention:

1. A control device of the character described, comprising a body having a fluid-filled chamber and an adjoining reservoir in valved communication therewith for controlling the flow of fluid therebetween, a collapsible tube section extending substantially centrally through said chamber in fluid-sealed relation thereto and adapted for connection to a conduit for conducting liquid by vacuum from a source of supply to a receiving container, means applied to diametrically opposite sides of said tube section for contractible engagement therewith to a closed sealed position, and relatively movable means constituting a fluid vent between said chamber and said reservoir and in operative actuating relation with said contractible means.

2. A control device of the character described, comprising a body having a fluid-filled chamber and an adjoining reservoir in valved communication therewith for controlling the flow of fluid therebetween, a collapsible tube section extending substantially centrally through said chamber in fluid-sealed relation thereto and adapted for connection to a conduit for conducting liquid by vacuum from a source of supply to a receiving container, means applied to diametrically opposite sides of said tube section for contractible engagement therewith to a closed sealed position, and fluid-vent forming means between said chamber and said reservoir including a sleeve-like member having a displaceable pin therein in abutting contact at one end with one of said contractible means, and a spring bearing on the other end of said pin for urging it toward such contractible means.

3. A control device of the character described, comprising a body having a fluid-filled chamber and an adjoining reservoir in valved communication therewith for controlling the flow of fluid therebetween, a collapsible tube section extending substantially centrally through said chamber in fluid-sealed relation thereto and adapted for connection to a conduit for conducting liquid by vacuum from a source of supply to a receiving container, means applied to diametrically opposite sides of said tube section for contractible engagement therewith to a closed sealed position, and fluid-vent forming means between said chamber and said reservoir including a sleeve-like member defining a passage opening at its ends into the reservoir and the chamber and provided at one end with a valve seat, and a stem guided in said sleeve-passage and defining a capillary vent therewith and provided at one end with a valve normally engaging said seat, the other end of said stem being in the path of movement of one of said contractible means for urging the stem to a valve-opening position at a predetermined time in the contraction of such means to a closed sealed position.

4. A control device of the character described, comprising a body having a fluid-filled chamber and an adjoining reservoir in valved communication therewith for controlling the flow of fluid therebetween, a collapsible tube section extending substantially centrally through said chamber in fluid-sealed relation thereto and adapted for connection to a conduit for conducting liquid by vacuum from a source of supply to a receiving container, means applied to diametrically opposite sides of said tube section for contractible engagement therewith to a closed sealed position, and fluid-vent forming means between said chamber and said reservoir including a sleeve-like member defining a passage opening at its ends into the reservoir and the chamber and provided at one end with a valve seat, a hollow stem guided in said sleeve-passage to provide a capillary vent therewith and provided at one end with a valve normally engaging said seat, the other end of said stem being in the path of movement of one of said contractible means for urging the stem to a valve-opening position at a predetermined time in the contraction of such means to a closed sealed position, a displaceable pin guided in said hollow stem in abutting contact at one end with one of said contractible means, a spring bearing on the other end of said pin for urging it toward said contractible means, and a spring bearing on said stem for normally urging its valve to a closed position.

5. A control device of the character described, comprising a body having a fluid-filled chamber and an adjoining reservoir in flow communication therewith, a check valve for normally preventing flow of fluid from the reservoir to the chamber, relatively-displaceable members constituting a capillary-like fluid vent between said reservoir and said chamber, a collapsible tube section extending through said chamber in fluid sealed relation thereto and adapted for connection to a conduit for conducting liquid by vacuum from a source of supply to a receiving container, and means disposed in contractible relation to the tube section and in governing relation to said displaceable vent members.

6. A control device for milking machines, comprising a body having a fluid filled chamber and an adjoining reservoir in capillary-like flow communication therewith, a teat cup connection in operative relation to said body for conducting the milk by vacuum from the cow to a receiving can having an intake spout, said connection including a collapsible tube section extending through said chamber in fluid sealed relation thereto and having a vent at the teat cup side of said body and a normally-closed vent at the opposite side thereof at its point of connection to said intake spout and adapted to be rendered operative to an open venting position only when the teat cup is released from the cow with its connection closed over the spout in pendant fashion therefrom, and means embracing diametrically opposite sides of said tube section for contractible engagement therewith to a fluid-sealed position.

7. A control device for milking machines, comprising a body having a fluid filled chamber and an adjoining reservoir in capillary-like flow communication therewith, a teat cup connection in operative relation to said body for conducting the milk by vacuum from the cow to a receiving can having an intake spout, said connection including a collapsible tube section extending through said chamber in fluid sealed relation thereto and having a vent at the teat cup side of said body, the can-spout having a longitudinal groove therein terminating short of the open end of the spout and forming a vent with the companion end of the connection which is only rendered operative to an open venting position when the teat cup is released from the cow with its connection closed over the spout in pendant fashion therefrom, and means embracing diametrically opposite sides of said tube section for contractible engagement therewith to a fluid-sealed position.

8. In a control device for milking machines, the combination with teat cup connection and a milk-receiving can including an intake spout, of a body adapted for interposition between the teat cup connection and spout and having a fluid filled chamber and an adjoining reservoir in valved communication therewith for controlling the flow of fluid therebetween, a collapsible tube section extending through said chamber in fluid-sealed relation thereto, and means at one end of said body for connecting said tube section in milk flow communication with the teat cup connection and including a vent to the atmosphere, the other end of the tube section including an extension projecting beyond the other end of said body and of reduced diameter for connection to said intake spout, the latter having a vent groove therein normally sealed at its inner end by the tube section extension when the device is in an operative milking position with the teat cup connection rising from the spout, such inner end of the vent groove being adapted to be uncovered by said tube extension and opened to the atmosphere to vent the tube section when the teat cup connection is released from the cow and in a position pendant from the spout.

9. In a control device for milking machines, the combination with a teat cup connection and a milk-receiving can including an intake spout, of a body adapted for interposition between the teat cup connection and spout and having a fluid filled chamber and an adjoining reservoir in multi-ported communication therewith for controlling the flow of fluid therebetween, the reservoir portion of the body having a flexible diaphragm constituting one of its walls adapted to expand and contract in accordance with the flow of fluid to and from the reservoir, a normally-closed check valve in correlation to one of the ports adapted to automatically open to cause the flow of fluid from the chamber to the reservoir, the other port constituting a by-pass of substantially capillary dimensions for the flow of fluid between said chamber and said reservoir, a normally-closed valve in correlation to said by-pass, a flexible contractible tube-like valve member fitted in said chamber in fluid-sealed relation thereto for connection at one end to the teat cup connection and at its other end to the intake spout and including opposing elements applied to opposite sides thereof for contracting said valve member in a transverse plane to a closed position when the surge of milk from the cow substantially ceases, said normally-closed, by-pass valve being in operative governed relation to one of said opposing contracting elements to cause such valve to open during the final contracting stroke of such elements, and means between the teat cup connection and one end of the tube-like valve member and between the opposite end of the latter and the intake spout for venting such member and said connection to the atmosphere.

10. The combination with a milking machine having a teat cup connection and a milk-receiving can including an intake spout, of a chambered body adapted to be interposed between said connection and said spout and including a collapsible tube section extending through said body in milk flow communication at one end with the teat cup connection and having a flexible extension at its other end for coupled attachment to said spout and adapted to fold over and close the mouth of the spout subsequent to the completion of a milking operation, means applied to said collapsible tube section for contractible engagement therewith to a closed sealed position, and means associated with said spout and its flexible connection for defining a vent normally closed during the milking operation and adapted to be opened when such connection is closed over the spout.

11. The combination with a milking machine having a teat cup connection and a milk-receiving can including an intake spout, of a collapsible tube section in milk flow communication at one end with the teat cup connection and having a flexible extension at its other end for coupled attachment to said spout and adapted to fold over and close the mouth of the spout subsequent to the completion of a milking operation, means applied to said collapsible tube section for contractible engagement therewith to a closed sealed position, and means associated with said spout and said flexible extension for defining a vent normally closed during the milking operation and adapted to be opened when such extension is closed in folded relation over the spout.

ALBERT G. PERKINS.

REFERENCES CITED

The following references are of record in the file of this patent:

UNITED STATES PATENTS

| Number | Name | Date |
| --- | --- | --- |
| 1,053,933 | Stowe | Feb. 18, 1913 |
| 1,109,800 | Sorensen | Sept. 8, 1914 |
| 1,164,304 | Nicewarner | Dec. 14, 1915 |
| 1,387,983 | Hofmeister | Aug. 16, 1921 |
| 2,558,152 | Perkins | June 26, 1951 |